United States Patent [19]

Rudisill, Jr.

[11] 4,176,255

[45] Nov. 27, 1979

[54] ADJUSTABLE IMPEDANCE BATTERY FEED CIRCUIT

[75] Inventor: John A. Rudisill, Jr., Flanders, N.J.

[73] Assignee: Bell Telephone Laboratories, Incorporated, Murray Hill, N.J.

[21] Appl. No.: 889,859

[22] Filed: Mar. 24, 1978

[51] Int. Cl.² .................... H04M 1/76; H04M 19/00
[52] U.S. Cl. .................................. 179/16 F; 179/70
[58] Field of Search ............ 179/70, 77, 16 F, 18 F, 179/18 FA, 70, 77, 170 NC

[56] References Cited

U.S. PATENT DOCUMENTS

| | | | |
|---|---|---|---|
| 3,035,122 | 5/1962 | Livingstone | 179/16 F |
| 3,187,104 | 6/1965 | Ebel | 179/16 F |

FOREIGN PATENT DOCUMENTS

| | | | |
|---|---|---|---|
| 1299735 | 7/1969 | Fed. Rep. of Germany | 179/16 F |
| 2209593 | 9/1973 | Fed. Rep. of Germany | 179/16 F |
| 2209639 | 9/1973 | Fed. Rep. of Germany | 179/16 F |

*Primary Examiner*—Kathleen H. Claffy
*Assistant Examiner*—Randall P. Myers
*Attorney, Agent, or Firm*—Thomas Stafford

[57] ABSTRACT

The magnitude of current supplied to a subscriber telephone loop during both loop start and ground start modes of operation is controllably limited by employing a battery feed circuit including an adjustable line build-out impedance. Resistors are controllably switched in or out of the battery feed circuit leads as a function of the potential developed across the line build-out impedance in a predetermined one of the battery feed circuit leads. Since the line build-out impedance being adjusted in value is within the detection loop, there is hysteresis in the switch points for switching the resistors in and out of the battery feed circuit leads. This hysteresis minimizes possible oscillation at the switch points and, therefore, minimizes development of unwanted signals on the subscriber loop. The use of an adjustable line build-out impedance further allows use of small resistance value, low wattage resistors as line build-out impedance elements. This improves overall efficiency and allows use of longer subscriber loops.

10 Claims, 5 Drawing Figures

FIG. I

ADJUSTABLE IMPEDANCE BATTERY FEED CIRCUIT

TECHNICAL FIELD

This invention relates to telephone loop circuits and, more particularly, to arrangements for supplying direct current from a central office battery or foreign exchange station unit to telephone subscriber loops or PBXs.

BACKGROUND OF THE INVENTION

In telephone subscriber loops it is necessary to supply direct current potential to subscriber equipment in order to effect communication. The current level supplied to the subscriber equipment must also be of sufficient magnitude to enable proper functioning of that equipment as well as the telephone company central office equipment. This current supply function is realized by employing a so-called battery feed circuit. Battery feed circuits typically include impedance elements commonly referred to as build-out resistors for limiting the current flow to the telephone loop in order to protect the central office battery, especially in ground start modes of operation. The current limiting impedance elements, however, operate also to limit the length of the subscriber loop connected to the battery feed circuit.

Consequently, it has become desirable to employ limiting elements or devices which exhibit a "high" impedance when a "low" impedance telephone loop is connected to the battery feed circuit and which exhibit a "low" impedance when a "high" impedance telephone loop is connected to the battery feed circuit.

A device which has long been employed for this purpose in telephone equipment is the so-called resistance lamp. The resistance of the lamp varies with variations in current. Thus, the lamp somewhat compensates for different length telephone loops connected to the battery feed circuit. One problem with the resistance lamp, however, is its relatively slow response to impedance changes or conditions of the telephone loop, for example, dial pulsing and the like. The response of the resistance lamp may be, for example, in the order of 15 to 20 seconds to go from an on to an off condition. Additionally, the lamps also have a relatively high impedance, therefore limiting the length of the subscriber loop which may be connected to the battery feed circuit.

Another device which has been employed as a battery feed current limiting elemment includes a non-linear resistance which varies in value in response to the magnitude of the loop current. As with the resistance lamp, the response of known non-linear resistance elements from an on to an off condition or vice versa is too slow. This and several other arrangements employed in attempts at minimizing attenuation of alternating signals are described in U.S. Pat. No. 3,187,104 issued June 1, 1965. However, the cited patent fails to address the problem of direct current attenuation caused by use of high resistance battery feed line build-out impedance elements.

Response time of the battery feed elements is also important to obtain improved performance during intervals of momentary changes of operational modes of the subscriber loop, for example, during dial pulsing, wink signaling and the like.

The lamp and other resistive elements heretofore employed for limiting current in battery feed circuits have relatively high resistance. Consequently, they were required to dissipate relatively "high" power necessitating use of "high" wattage elements. Therefore, it is also desirable to minimize the power dissipation in battery feed circuit elements in order to minimize the physical size of those elements and to improve overall efficiency.

SUMMARY OF THE INVENTION

These and other problems are resolved in a battery feed circuit by employing an adjustable build-out impedance having improved reaction time. The build-out impedance includes controllably adjustable impedance elements and a control circuit responsive to a potential developed at a prescribed circuit point in the battery feed circuit for adjusting the impedance value inserted in the leads of the battery feed circuit, thereby adjusting the battery feed build-out impedance value in relation to the magnitude of line current. At least one of the adjustable impedance elements is connected in circuit between a source of potential and the prescribed circuit point to introduce hysteresis in the potential developed at the circuit point upon adjustment of the impedance value.

In one embodiment of the invention the adjustable build-out impedance includes resistors which are connected in series in the leads of the battery feed circuit. Predetermined ones of the resistors are each advantageously shunted or not by relay contacts for controllably switching the resistors in or out of the battery feed circuit. Switching control is realized by sensing the potential difference between the source of potential and a predetermined output terminal of the battery feed circuit. At least one of these resistors is serially connected in circuit between the source of potential and the predetermined output terminal. This introduces the desired hysteresis in the switching points, i.e., in the current levels at which the resistors are switched in and out of the battery feed circuits.

Hysteresis in the switching points minimizes the possibility of oscillation in switching because of foreign potential on the line, i.e., hum or the like.

BRIEF DESCRIPTION OF THE DRAWINGS

The and other objects and advantages of the invention will be more fully understood from the following detailed description of one embodiment of the invention taken in accordance with the appended drawings in which.

DETAILED DESCRIPTION

Figure 1:
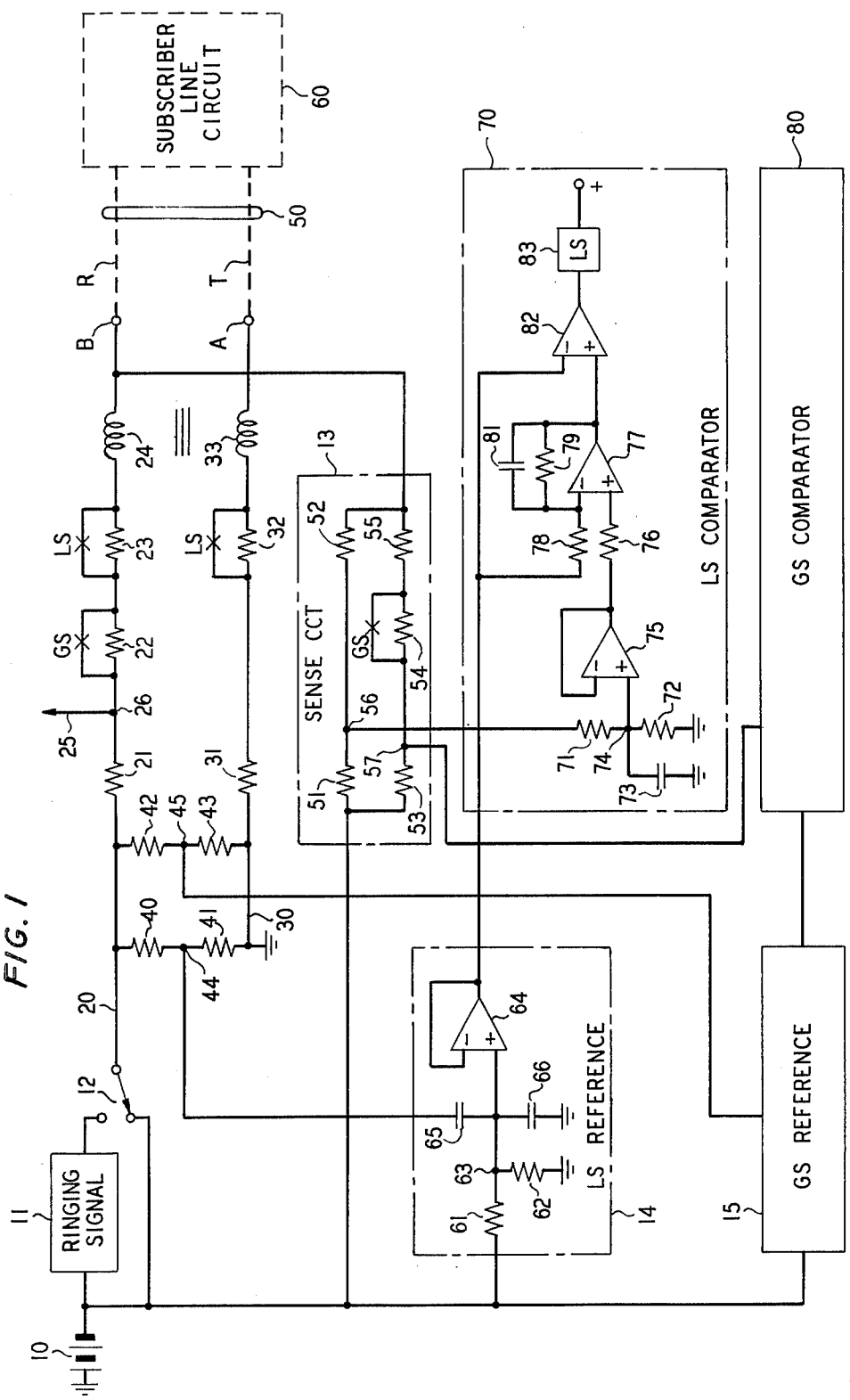
FIG. 1 is a simplified diagram of a battery feed circuit illustrating one embodiment of the invention.

FIG. 1 depicts a telephone battery feed circuit including one embodiment of the invention. Accordingly, shown is direct current potential source 10. Source 10 is commonly referred to as the office battery and typically is −48 volts dc. Source 10 is connected between a reference potential point, for example, ground potential, and ringing signal source 11, a first terminal of switch 12, sense circuit 13, loop start (LS) reference source 14, and ground start (GS) reference source 15. An output of ringing signal source 11 is connected to a second terminal of switch 12. Source 11 generates a typical ringing signal at 20 Hz and approximately 88 volts RMS in well-known fashion.

Normally, switch 12 connects source 10, i.e., −48 volts dc, to battery feed circuit path 20. During ringing intervals, switch 12 momentarily connects source 10 and ringing signal source 11 to first battery feed path 20 in well-known fashion. Battery feed circuit path 20 includes a line build-out impedance comprising in this embodiment resistors 21, 22 and 23, and SX inductor coil 24, all serially connected between a first terminal connected to switch 12 and a second terminal, namely, terminal B of the battery feed circuit. Thus, the first and second terminals of path 20 are adapted to be connected between direct current source 10 and a first lead of telephone loop 50. Resistor 22 is shunted by a circuit path including a switching element, namely, a make contact of a first control relay designated the ground start relay (GS). Similarly, resistor 23 is shunted by a circuit path including a switching element, namely, a make contact of a second control relay designated loop start relay (LS). The GS and LS relay contacts are employed in this embodiment of the invention to adjust controllably the impedance value of the line build-out impedance of battery feed circuit path 20. Preferably, the GS and LS relays are so-called miniature mercury wetted relays having a response time of less than one millisecond, for example, type 345A manufactured by Western Electric Company. Circuit path 25 supplies signals developed at circuit point 26 to loop closure and ring trip circuits for purposes which will be apparent to those skilled in the art. It should be noted that in modern telephone equipment at least one of the line build-out impedance elements must be a fixed value to allow proper performance of signaling functions. This requirement is satisfied by resistor 21.

Second battery feed circuit path 30 includes a first terminal connected to a reference potential point, i.e., ground potential, and a second terminal, namely, terminal A of the battery feed circuit. Terminal A is adapted to be connected to a second lead of telephone loop 50. Loop 50 is typically a transmission line of the 2-lead type telephone line. Battery feed circuit path 30 includes a line build-out impedance comprising resistors 31 and 32 and SX inductor coil 33. Resistor 32 is shunted by a circuit path including a switching element, namely, a make contact of the loop start relay (LS). The LS relay contact shunting resistor 32 is employed to adjust controllably the impedance value of the line build-out impedance of battery feed circuit path 30.

As will be apparent to those skilled in the art, the impedance of circuit paths 20 and 30 should be substantially equal for loop start (LS) operation in order to maintain longitudinal balance of the loop circuit. Consequently, the impedance values of resistors 21 and 31, and 23 and 32 are equal. Moreover, resistors 23 and 32 are either both inserted in or both shorted out of circuit paths 20 and 30, respectively. It should be noted, that in modern telephone equipment one of the battery feed resistors, 21 in this example, must remain a constant fixed value to perform necessary signaling function. During ground start operation the impedance of the loop is out of balance anyway and it is not important to maintain longitudinal balance of the battery feed circuit.

In an example from experimental practice, resistance values of resistors 21 and 31 are 100 ohms, resistors 23 and 32 are 132 ohms, and resistor 22 is 454 ohms, and all have 1 watt power ratings except resistor 22 which is 3 watts. Thus, the size, resistance values and power dissipated in the battery feed circuit are significantly reduced as compared to prior known arrangements. Moreover, since the resistance value of the feed circuit is significantly lower than known prior arrangements longer length subscriber loops may be employed.

Battery feed circuit paths 20 and 30 are shunted by high impedance voltage dividers including parallel connections of resistors 40 and 41, and 42 and 43, respectively. The signal developed at circuit point 44 is supplied to LS reference 14 while the signal developed at circuit point 45 is supplied to GS reference 15 and will be discussed below.

Terminals A and B of the battery feed circuit are typically connected across a so-called midpoint capacitor of a hybrid transformer (not shown). The midpoint capacitor and SX inductor coils 24 and 33 form a filter in well-known fashion for filtering voice frequency signals. That is to say, the voice frequency signals are filtered out of the battery feed circuit. Additionally, the SX inductor coils limit the rise time of current in the subscriber loop thereby minimizing crosstalk between loops. In turn, the coils of the hybrid transformer (not shown) are connected to the tip (T) and ring (R) leads of subscriber loop 50. In turn, loop 50 is connected to subscriber line circuit 60. As described above, it is desirable to maintain the current supplied over subscriber loop 50 to subscriber line circuit 60 above some minimum level to realize proper operation of both the subscriber equipment and the telephone central office equipment. Additionally, it is equally important to limit the current supplied via loop 50. This is especially critical during the ground start (GS) mode of operation when the battery feed circuit is connected to a short length loop 50 or when the loop is faulted. Control of the battery feed current is achieved for both loop start and ground start modes of operation by adjusting the line build-out impedance in the leads of the battery feed circuit by controllably switching resistors 22, 23 and 32 in and out of leads 20 and 30 of the battery feed circuit. Resistor 22 is shorted out of lead 20, i.e., shunted, during normal loop start operation by relay contact GS. Adjusting the build-out impedance by switching of resistors 22, 23 and 32 is effected by a control circuit including sense circuit 13, LS reference 14, GS reference 15, LS comparator 70 and GS comparator 80.

Sense circuit 13 is employed to detect the potential difference between source 10 and a predetermined terminal of the battery feed circuit, namely, terminal B. It is important to note that sense circuit 13 is connected at a point in the battery feed circuit that includes resistors 22 and 23 in the detection loop. This effects the desired hysteresis in the switching points. That is to say, when resistors 22 or 23 are switched in or shorted out of lead 20 of the battery feed circuit the sensed potential changes instantaneously, thereby minimizing the possibility of oscillation about the particular switching points because of hum typically found on telephone loops. This operation will be further described below.

Sense circuit 13 includes a loop start (LS) sense path including resistors 51 and 52 and a ground start (GS) sense path including resistors 53, 54 and 55. Resistor 54 is shunted by a circuit path including a switching element, namely, a make contact of the ground start control relay (GS). Thus, resistor 54 is controllably switched in and out of the ground start sense path in order to limit the amount of hysteresis in the switching points for ground start modes of operation. Otherwise, the current flowing through circuit path 20 of the battery feed circuit would be allowed to become too great in magnitude before resistor 22 was again inserted to limit the current flow. As will be apparent to those skilled in the art, the resistance value of resistors 51 and 52 in the LS sense circuit, and 53, 54 and 55 in the GS sense circuit should be selected to minimize loading and to obtain a desired voltage division. In an example from experimental practice, the combined values of resistors 51 and 52, and the combined value of resistors 53, 54 and 55 are approximately 115 kilohms with a voltage division of approximately 12-to-1. When resistor 54 of the GS sense circuit is bypassed the voltage division is approximately 7.5-to-1. Consequently, the portion of the signal developed between source 10 and terminal B detected by the ground start sense circuit is controllably adjusted.

A potential developed at circuit point 56 in the loop start sense path is supplied to LS comparator 70 while a potential developed at circuit point 57 in the ground start sense path is supplied to GS comparator 80. Additionally, a reference potential generated by LS reference 14 is supplied to LS comparator 70 while a reference potential generated by GS reference 15 is supplied to GS comparator 80.

LS reference source 14 and GS reference source 15 are essentially identical except for component values. Accordingly, only LS reference 14 will be described in detail. LS reference 14 develops a reference signal including dc component LS-VREF and, if a ringing signal from source 11 is applied, ac component LS-VS. LS reference 14 includes a dc voltage divider comprising resistors 61 and 62. Resistors 61 and 62 develop reference potential LS-VREF at circuit point 63 which is a predetermined proportion of the potential of battery 10. It is important that potential LS-VREF is developed from office battery 10 so that the magnitude of potential LS-VREF tracks any variations in the office battery potential to insure accurate switching of the line build-out resistors at desired current levels in loop 50. Potential LS-VREF developed at circuit point 63 is supplied to a non-inverting input of amplifier 64. Amplifier 64 is employed as a buffer amplifier in well-known fashion. Capacitors 65 and 66 form an alternating current voltage divider which is employed to generate an ac signal proportional to that developed at circuit point 44. The ac signal developed at circuit point 44 is proportional to the 20 Hz ringing signal supplied from ringing signal generator 11 during ringing intervals. The component values of capacitors 65 and 66 are selected so that a replica of the ringing signal, namely LS-VS, having a desired magnitude and phase is developed at the output of LS reference 14. The need for a ringing signal component in the output of LS reference 14 is necessitated because during ringing intervals, the ringing signal appears at terminal B of the battery feed circuit and is detected by sense circuit 13. Otherwise, errors would result in the operation of the LS and GS relays, thereby causing the value of the line build-up impedance to be erroneously adjusted because of the modulation of the potential detected at terminal B by the 20 Hz ringing signal component. Consequently, a ringing signal component is also supplied from circuit points 56 and 57 to LS comparator 70 and GS comparator 80, respectively. Since it is required that the battery feed circuit respond rapidly to impedance changes between terminals A and B the 20 Hz signal cannot be completely filtered out of the inputs to comparator circuits 70 and 80. Thus, the ringing signal component in the output of reference sources 14 and 15 is adjusted to be substantially equal in magnitude and phase to that supplied to the corresponding comparator from sense circuit 13.

LS comparator 70 and GS comparator 80 are also essentially identical from a circuit standpoint except for some component value variations. Therefore, only LS comparator 70 will be described in detail. Accordingly, comparator 70 includes resistors 71 and 72 which form a voltage divider. The use of a voltage divider is employed to minimize the amplitude of the hum (60 Hz) component in the input supplied to comparator 70 from sense circuit 13 and, also, to facilitate filtering of other unwanted signals. Resistor 72 is shunted by capacitor 73 for filtering hum and higher frequency components. The voltage divider including resistors 71 and 72 in conjunction with the loop start sense circuit of circuit 13 generates VIN at circuit point 74. VIN is a predetermined portion of the signal developed between source 10 and terminal B. Signal VIN developed at circuit point 74 includes a dc component, and during ringing intervals a ringing signal component, and is supplied to a non-inverting input of amplifier 75. Amplifier 75 is connected in well-known fashion as a buffer amplifier. An output of amplifier 75 is connected via resistor 76 to a non-inverting input of amplifier 77. The reference signal from source 14 is supplied via resistor 78 to an inverting input of amplifier 77. Resistor 79 and capacitor 81 are connected in parallel between the inverting input and an output of amplifier 77 and form a feedback path. The component values of resistors 78 and 79 are selected so that a predetermined dc gain is realized for the difference between the reference signal supplied from reference source 14 and an input signal supplied from sense circuit 13 via amplifier 75. It is important to note that the gain of amplifier 77 and its associated components for dc signals and ac signals is different. This is realized by use of capacitor 81 shunting resistor 79 to form a filter. Thus, hum and higher frequency components are further minimized. The values of resistors 71 and 72 and gain associated with amplifier 77 are such that the dc signal supplied to the non-inverting input of differential amplifier 82 is essentially VIN developed at circuit point 74 in response to the input signal supplied from circuit 13 to LS comparator 70 algebraically combined with an amplified difference signal. The difference signal being the difference between the outputs of reference 14 and amplifier 75 and the dc amplification being the ratio of the resistance values of resistor 79 divided by resistor 78. The inverting input of amplifier 82 is connected to the output of reference 14. Any ringing signal component is substantially reduced in amplifier 77, and finally cancelled by common mode rejection in amplifier 82, while hum and higher frequency components are substantially filtered by capacitor 81 in conjunction with amplifier 77. In an example from experimental practice, resistors 71 and 72 yield a voltage division of approximately 11-to-1 resistors 78 and 79 in conjunction with amplifier 77 yield a negative gain of approximately 10 for dc signals supplied from reference source 14 and a positive gain of approximately 11 for dc signals from amplifier 75. It is noted that hum and higher frequency components are substantially reduced by the additional filtering in comparator 70 provided by capacitor 73. Capacitor 73 also eliminates lightning induced impulses. The reference signal from source 14 is supplied to the inverting input of amplifier 82. Amplifier 82 is employed as a comparator. Thus, when the magnitude of the signal supplied from amplifier 77 to the non-inverting input of amplifier 82 is greater than the magnitude of the reference supplied from reference source 14 to the inverting input, the output of amplifier 82 is negative, and LS relay 83 is enabled. When the magnitude of the signal supplied to the non-inverting input of amplifier 82 is smaller than the signal supplied to the inverting input from reference 14, the output of amplifier 82 is a positive potential and LS relay 83 is disabled. In one example from experimental practice, LS relay 83 includes two of the miniature mercury wetted contact type noted above connected in series. This enables simultaneous operation of the contacts connected across resistors 23 and 32. It is also noted that the amplifiers employed in reference 14 and comparator 70 are of the high gain differential type now commonly referred to as operational amplifiers.

Figure 2:
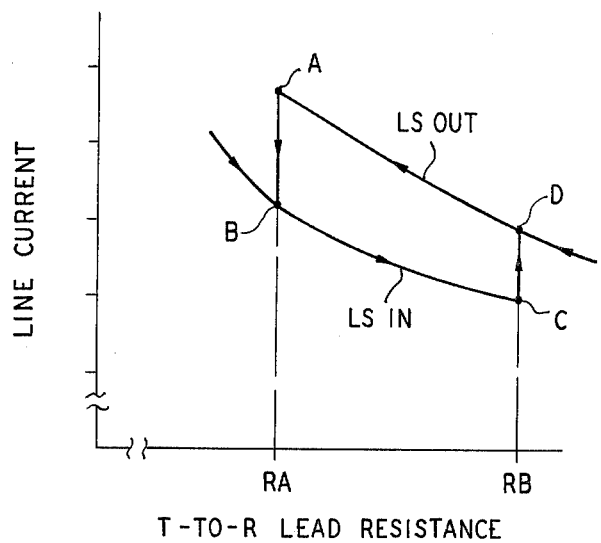
FIG. 2 diagramatically depicts subscriber line current versus tip-to-ring lead resistance and is useful in describing loop start mode of operation of the battery feed circuit.
Figure 3:
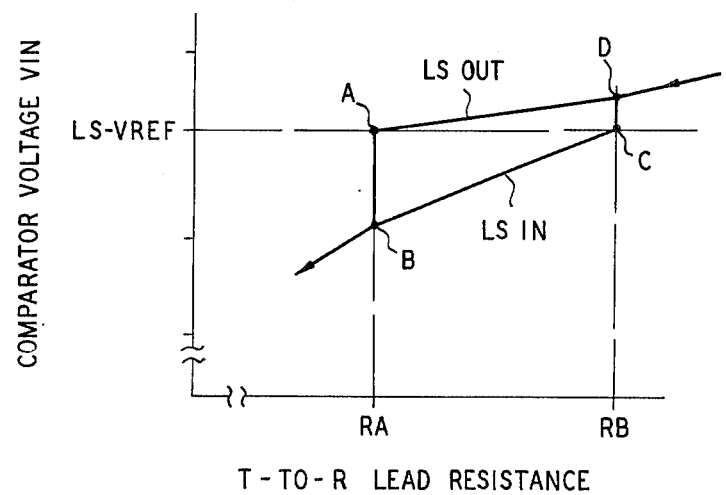
FIG. 3 diagramatically illustrates LS comparator voltage VIN versus tip-to-ring lead resistance also useful in illustrating the loop start mode of operation of the battery feed circuit.
Figure 4:
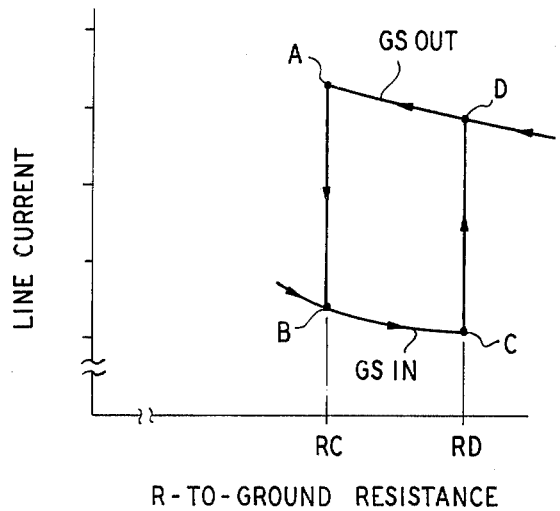
FIG. 4 shows a diagram of line current versus ring lead-to-ground resistance useful in describing ground start mode of operation of the battery feed circuit.
Figure 5:
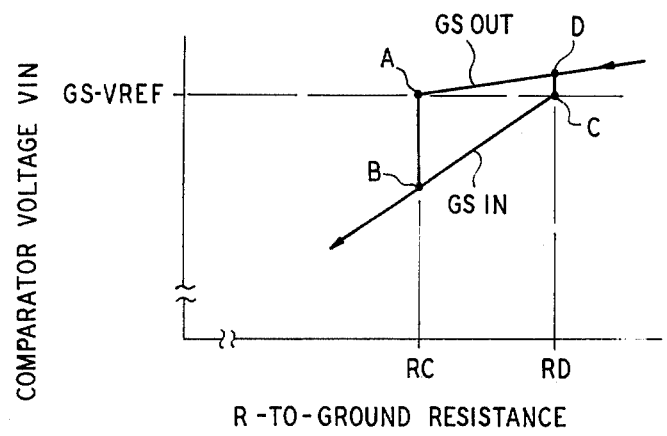
FIG. 5 graphically illustrates the GS comparator voltage VIN versus ring lead-to-ground resistance also useful in describing the ground start mode of operation of the battery feed circuit.

Operation of the present embodiment of the invention may best be explained by referring to FIGS. 2-5. FIG. 2 illustrates line current versus tip (T)-to-ring (R) lead resistance, while FIG. 3 illustrates comparator 70 (FIG. 1) voltage VIN versus T-to-R lead resistance, both for loop start (LS) operation. Similarly, FIG. 4 illustrates line current versus R-to-ground resistance, and FIG. 5 illustrates comparator 80 voltage VIN versus R-to-ground resistance, both for ground start (GS) operation. The comparator voltage VIN is a predetermined proportion of the input signal supplied from sense circuit 13.

Initially, it is assumed that loop 50 (FIG. 1) appears to be an open circuit to the battery feed circuit. Under that condition, line current is substantially zero (not shown) and voltages VIN to comparators 70 and 80, in this example, are more negative than the references. Additionally, resistors 22, 23 and 32 are all by-passed via the associated contacts of the operated LS and GS relays and, hence, are switched out of the battery feed circuit.

Let us first assume a loop start mode of operation. The, LS-VREF (FIG. 3) is selected primarily to effect simultaneous switching of resistors 23 and 32 in and out of the battery feed circuit at predetermined loop current values. It is noted that during normal loop start operation, resistor 22 is switched out of battery feed lead 20 by the operated GS relay. Resistors 23 and 32 remain switched out of the battery feed circuit until a loop is connected having an impedance less than a predetermined value, namely, RA. Additionally, VIN to LS comparator 70, developed at 74 in response to the signal detected at point 56 of sense circuit 13, has a magnitude substantially equal to but less than LS-VREF, for example, as illustrated at point A in FIG. 3. In this example, switching point A corresponds to a line current level of approximately 77 milliamperes, as illustrated at point A in FIG. 2, and a T-to-R lead resistance RA of approximately 340 ohms. Once resistors 23 and 32 are inserted via the LS relay into battery feed leads 20 and 30, respectively, the current level and, consequently, the voltage level detected at terminal B, are instantaneously reduced in magnitude. Specifically, the current level is reduced to approximately 55 milliamperes, as illustrated at point B of FIG. 2, and the magnitude of VIN to comparator 70 is reduced approximately −3.91 volts, as illustrated at point B of FIG. 3. This reduction in magnitude of the line current and VIN to comparator 70 is realized because resistor 23 is serially inserted in battery feed lead 20 between source 10 and terminal B. That is to say, at least one of the line build-out impedance elements, namely, resistor 23, is included in the loop start detection loop. In effect, inclusion of resistor 23 in the detection loop of sense circuit 13 causes hysteresis in the current switching points for loop start modes of operation. This is important to eliminate the possibility of oscillation about the switching point because of hum and other unwanted signal components developed on loop 50. Resistors 23 and 32 remain inserted into leads 20 and 30, respectively, for both higher and lower current levels. Thus, resistors 23 and 32 will remain inserted in the battery feed circuit until the T-to-R lead resistance becomes greater than a resistance RB which, in this example, is approximately 670 ohms, and the line current drops to a magnitude of approximately 40 milliamperes, as illustrated at point C of FIG. 2. This represents VIN to comparator 70 having a magnitude which is substantially equal to but greater than LS-VREF. Then, both resistors 23 and 32 are simultaneously by-passed by the corresponding contacts of LS relay 83 and the line current is increased in magnitude to approximately 50 milliamperes, as illustrated at point D of FIG. 2. Correspondingly, VIN to comparator 70 is also instantaneously increased to a value of approximately −3.98 volts, as illustrated at point D of FIG. 3. Again, possible oscillation around the switching points is avoided by the hysteresis realized by switching of resistor 23 out of the detection circuit. Resistors 23 and 32 will remain switched out of the battery feed circuit for both higher and lower line current magnitudes until the line current again exceeds the value at point A of FIG. 1 and VIN to comparator 70 drops below LS-VREF, as illustrated at point A of FIG. 3.

The response time of LS relay 83 and also the GS relay (discussed below) should be as short as possible to minimize unwanted over shooting of the current switch points. The short response time is also important during dial pulsing. In this example the relay response time is approximately 1 millisecond which is short compared to the current rise in the loop (approximately 10 milliamperes per millisecond).

Let us now consider the ground start mode of operation of the battery feed circuit. When dealing with long lengths of loop 50 it should be noted that only resistors 23 and 32 may be inserted in the battery feed leads 20 and 30, respectively, for ground start operation. The ground start resistor 22 may not necessarily be inserted into lead 20. Then, operation of the battery feed circuit is substantially as described above for loop start operation insofar as the switch points for LS resistors 23 and 32 are concerned. However, when resistor 22 is inserted into lead 20, resistors 23 and 32 are also inserted in leads 20 and 30, respectively, because GS-VREF is smaller in magnitude than LS-VREF.

FIGS. 4 and 5 illustrate ground start operation when GS resistor 22 is switched in and out of battery feed lead 20. It is assumed that LS resistors 23 and 32 are inserted in their respective leads when the GS circuit operates.

Assuming an initial open circuit condition, all of resistors 22, 23 and 32 are switched out of battery feed leads 20 and 30. When LS-VREF (FIG. 3) is reached, LS resistors 23 and 32 are switched in leads 20 and 30, respectively. It is noted that LS-VREF is greater in magnitude than GS-VREF. Consequently, the LS-VREF is reached prior to the GS-VREF and the LS resistors are always switched in prior to or simultaneously with GS resistor 22. If the line current is a value which causes GS-VREF to be reached as indicated by point A in FIG. 5, GS resistor 22 is inserted, i.e., switched into lead 20 via the associated contact of the GS relay, and resistor 54 is simultaneously inserted in the GS sense circuit path of sense circuit 13. This switch point corresponds to a line current of approximately 80 milliamperes at a R-to-ground resistance of approximately 346 ohms, as indicated by point A in FIG. 4. Insertion of resistor 54 causes the voltage division ratio of the GS sense circuit path to increase from approximately 7.5-to-1 to approximately 12-to-1. Thus, in response to the insertion of resistor 22 within the detection loop and the changing of the voltage division ratio, VIN to comparator 80 instantaneously changes to a lower magnitude, as indicated at point B in FIG. 5. The line current is also instantaneously reduced to a value of approximately 46 milliamperes, as indicated at point B of FIG. 4.

The inclusion of resistor 22 within the ground start detection loop insures hysteresis in the GS current switching points, thereby minimizing the possibility of oscillating at the switch points and minimizing possible problems resulting from unwanted signals on the subscriber line. Use of an adjustable voltage division ratio in the GS sense circuit path limits the magnitude that the line current can reach before the GS resistor 22 is switched into lead 20. This, in a sense, limits the amount of hysteresis in the current switch points for GS operation. Moreover, the line current is further maintained within a desired range. Otherwise, excessive power dissipation may result requiring the use of higher wattage rated components. Such components would increase the size of the overall circuit and decrease overall efficiency. GS resistor 22 is always switched in for all R-to-ground resistance values less than RC and once switched in remains switched in for values of resistance RC to RD, where RD is approximately 420 ohms, until GS-VREF is reached, as indicated at point C in FIG. 5. This corresponds to a line current value of approximately 43 milliamperes, as indicated by point C in FIG. 4. When the input voltage to comparator 70 magnitude is substantially equal to but greater than GS-VREF, resistor 22 is by-passed, i.e., switched out of lead 20 via the associated contact of the GS relay along with resistor 54 of the GS sense circuit and VIN to comparator 80 is instantaneously changed to a potential as indicated at point D in FIG. 5. The line current is also substantially instantaneously increased to a value of approximately 71 milliamperes, as indicated at point D in FIG. 4.

Thus, it is seen that by controllably adjusting the line build-up impedance as illustrated in this embodiment of the invention, line current levels are controllably maintained at levels which enable operation of customer equipment and telephone company equipment over substantially longer loops, while employing circuit elements having substantially lower power dissipation ratings and line feed resistors 21 and 31 having lower resistance values. Consequently, overall circuit efficiency is improved while reducing the physical size of the circuit. Moreover, by employing hysteresis in the switch points at which the resistors are switched in and out of the battery feed leads, possible generation of unwanted line current flucuations are minimized.

The above-described embodiment is, of course, merely illustrative of an application of the inventive principles discussed. Numerous other arrangements may be devised by those skilled in the art without departing from the spirit or scope of these inventive principles. For example, impedance elements other than resistors may be advantageously employed to control the battery feed circuit line build-out impedance, thereby controlling line current supplied to subscriber equipment. Moreover, elements other than relays may be equally advantageously employed to switch one or more resistors into one or more of the battery feed circuit paths under control of comparator circuits or the like to realize a desired current control function. Indeed, more than one relay may be employed to insert more than one resistor into each battery feed circuit path for both the loop start or ground start control functions, thereby also realizing a desired line current control. The potential, current and circuit element values used herein are merely illustrative of one example from experimental practice. Other values may be equally employed to obtain a desired result.

I claim:

1. A battery feed circuit of the type having first and second circuit paths for supplying direct current from a source of direct current potential to a transmission line and including line build-out impedance elements serially connected in circuit in the first and second circuit paths for limiting the magnitude of the supplied current, CHARACTERIZED BY, means responsive to first control signals and supplied with a potential developed between the source of direct current potential and a prescribed circuit point in the battery feed circuit for generating a first signal which is a controllably adjusted predetermined portion of said developed potential, means responsive to said first signal for generating first control signals, and at least first controllable line build-out impedance means responsive to said first control signals and being serially connected in circuit in the first circuit path between said source of potential and said prescribed circuit point and being responsive to said first control signals for adjusting the line build-out impedance value in the battery feed circuit thereby controllably limiting the magnitude of current supplied to the transmission line.

2. A battery feed circuit of the type having first and second circuit paths for supplying direct current from a source of direct current potential to a transmission line and including line build-out impedance elements serially connected in circuit in the first and second circuit paths for limiting the magnitude of the supplied current, CHARACTERIZED BY, means for generating a first signal which is a predetermined portion of a potential developed between said source of direct current potential and a prescribed circuit point in the battery feed circuit and being responsive to at least first control signals for controllably adjusting the predetermined portion that said first signal is of said developed potential, means for generating a first reference signal, first comparator means responsive to said first reference signal and said first signal for generating said first control signals, and at least first controllable line build-out impedance means responsive to said first control signals and being serially connected in circuit in the first circuit path between said source of potential and said prescribed circuit point for adjusting the line build-out impedance value of the battery feed circuit thereby controllably limiting the magnitude of the current supplied to the transmission line.

3. A battery feed circuit of the type having first and second circuit paths for supplying direct current from a source of direct current potential to a transmission line and including line build-out impedance elements serially connected in circuit in the first and second circuit paths for limiting the magnitude of the supplied current, CHARACTERIZED BY, means responsive to a potential developed between the source of direct current potential and a prescribed circuit point in the battery feed circuit for generating first and second control signals, first controllable line buildout impedance means serially connected in circuit in the first circuit path between said source of potential and said prescribed circuit point and being responsive to said first control signals for adjusting the line build-out impedance value of the first circuit path in the battery feed circuit, second controllable line build-out impedance means connected in said second circuit path and being responsive to said first control signals for adjusting the line build-out impedance of the second circuit path in the battery feed circuit, and at least third controllable line build-out impedance means serially connected in circuit in said first circuit path between said source of direct current potential and said prescribed circuit point and being responsive to said second control signals for further adjusting the line build-out impedance of the first circuit path in the battery feed circuit thereby controllably limiting the magnitude of the current supplied to the transmission line.

4. A battery feed circuit as defined in claim 3 wherein said first, second and third controllable line built-out impedance means such includes at least one controllable resistor means responsive to the corresponding ones of said control signals.

5. A battery feed circuit as defined in claim 4 wherein said at least one controllable resistor means includes at least one resistor means connected in parallel with a circuit path including a controllable switching means.

6. A battery feed circuit as defined in claim 5 wherein said controllable switching means includes relay means responsive to said corresponding ones of said control signals for controllably bypassing said resistor means.

7. A battery feed circuit as defined in claim 3 wherein said control signal generating means includes first means for generating a first signal which is a first predetermined portion of the potential developed between said source of direct current potential and said prescribed circuit point, second means for generating a second signal which is a second predetermined portion of the potential developed between said source of direct current potential and said prescribed circuit point, means for generating a first reference signal, means for generating a second reference signal, first comparator means responsive to said first reference signal and said first signal for generating said first control signals, and second comparator means responsive to said second reference signal and said second signal for generating said second control signals.

8. A battery feed circuit as defined in claim 6 wherein said second signal generating means includes means responsive to said second control signals for controllably adjusting the second predetermined portion that said second signal is of the potential developed between the source of direct current potential and said prescribed circuit point.

9. A battery feed circuit as defined in claim 6 wherein said first and second reference signal generating means each includes means in circit with said source of direct current potential for generating a direct current potential reference component, and means in circuit with said first circuit path for generating an alternating current potential reference component during intervals that a ringing signal is present.

10. A battery feed circuit as defined in claim 6 wherein said first comparator means includes first amplifier means having first and second inputs and an output, said first reference signal being supplied to said first input, said first signal being supplied to said second input, said first amplifier means being arranged to generate in response to said first reference signal and said first signal a first output signal equal to said first signal plus an amplified version of the algebraic difference between said first signal and said first reference signal, and second amplifier means having first and second inputs and an output, said first reference signal being supplied to said first input and said first output signal from said first amplifier means being supplied to said second input, said second amplifier means being responsive to said first reference signal and said first output signal to generate said first control signals at said output of said second amplifier means, and wherein said second comparator means includes third amplifier means having first and second inputs and an output, said second reference signal being supplied to said first input, said second signal being supplied to said second input, said third amplifier means being arranged to generate a second output signal equal to said second signal plus an amplified version of the algebraic difference between said second signal and said second reference signal, and fourth amplifier means having first and second inputs and an output, said second reference signal being supplied to said first input, said second output signal being supplied to said second input, said fourth amplifier means being responsive to said second reference signal and said second output signal to generate said second control signals at said output of said fourth amplifier means.

* * * * *